United States Patent
Wang

(10) Patent No.: US 6,310,165 B1
(45) Date of Patent: Oct. 30, 2001

(54) POLYMERIZATION PROCESS WITH NOVEL CATALYST SYSTEM

(75) Inventor: Jin-Shan Wang, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/442,826

(22) Filed: Nov. 18, 1999

(51) Int. Cl.$^7$ .................................................. C08F 210/00
(52) U.S. Cl. .......................... 526/348; 526/171; 526/173; 526/147; 526/161
(58) Field of Search .................................. 526/171, 173, 526/147, 161, 348

(56) References Cited

PUBLICATIONS

Reetz et al., Macromol. Rapid Commun., 17, 383–388, 1996.*

\* cited by examiner

*Primary Examiner*—David W. Wu
*Assistant Examiner*—Ling-Siu Choi
(74) *Attorney, Agent, or Firm*—Andrew J. Anderson

(57) ABSTRACT

A process for polymerization of vinyl monomers is described comprising (a) forming an onium salt complex comprising a transition metal component by reacting an onium salt with a transition metal species, and (b) polymerizing vinyl monomers in the presence of the formed transition metal containing onium salt and an organic halide initiator compound. The present invention provides a novel method for living polymerization of vinyl monomers, which provides a high level of macromolecular control over polymerization process and which leads to more uniform and more controllable polymeric products. In accordance with preferred embodiments of the invention, the organic halide initiator comprises an organic chloride or bromide compound, as the onium salt complexes which comprise a transition metal provide increased catalytic effect required for use of such initiator compounds relative to organic iodide initiator compounds.

25 Claims, No Drawings

POLYMERIZATION PROCESS WITH NOVEL CATALYST SYSTEM

FIELD OF THE INVENTION

The present invention relates to novel "living" polymerization process, particularly to a "living" polymerization process employing onium salt catalysts comprising transition metal species.

BACKGROUND OF THE INVENTION

Conventional chain polymerization of vinyl monomers usually consists of three main elemental reaction steps: initiation, propagation, and termination. Initiation stage involves creation of an active center from an initiator. Propagation involves growth of the polymer chain by sequential addition of monomer to the active center. Termination (including irreversible chain transfer) refers to termination of the growth of the polymer chain. Owing to the presence of termination and poorly controlled transfer reactions, conventional chain polymerization typically yields a poorly controlled polymer in terms of predicted polymer properties. Moreover, conventional chain polymerization processes mostly result in polymers with simple architectures such as linear homopolymer and linear random copolymer.

In 1950s, a so-called living polymerization was discovered by Szwarc (Szwarc, et al. J. Am. Chem. Soc. 78, 2656 (1956)). Living polymerization was characterized by the absence of any kinds of termination or side reactions which might break propagation reactions. The most important feature of living polymerization is that one may control the polymerization process to design the molecular structural parameters of the polymer. Additional polymerization systems where the termination reactions are, while still present, negligible compared to propagation reaction have also been disclosed. As structural control can generally still be well achieved with such processes, they are thus often termed "living" or controlled polymerization (Wang, Macromolecules, 28, 7901 (1995)). In living and "living" (or controlled) polymerization, as only initiation and propagation mainly contribute to the formation of polymer, molecular weight can be predetermined by means of the ratio of consumed monomer to the concentration of the initiator used. The ratio of weight average molecular weight to number average molecular weight, i.e., molecular weight distribution (Mw/Mn), may accordingly be as low as 1.0. Moreover, polymers with the specifically desired structures and architectures can be purposely produced. In terms of topology, such structures and architectures may include: linear, star, comb, hyperbranched, dendritic, cyclic, network, and the like. In terms of sequence/composition distribution such structures and architectures may include: homopolymer, random copolymer, block copolymer, graft copolymer, gradient copolymer, tapered copolymer, periodic copolymer, alternating copolymer, and the like. In terms of functionalization, such structures and architectures may include: telechlics, macromonomer, labeled polymer, and the like.

Over the past 40 years, a number of living/"living" polymerization processes have been developed. Examples of these polymerization processes include: anionic polymerization (Szwarc, J. Am. Chem. Soc. 78, 2656 (1956)), cationic polymerization (Sawamoto, Trends Polym. Sci. 1, 111 (1993)), ring opening methathesis polymerization (Gillium and Grubbs, J. Am. Chem. Soc. 108, 733 (1986)), nitroxides-mediated stable radical polymerization (Solomon, U.S. Pat. No. 4,581,429 (1986), Georges, Macromolecules, 26, 2987 (1993)), Cobalt complexes-mediated radical polymerization (Wayland, J. Am. Chem. Soc. 116, 7943 (1994)), and transition metal catalyzed atom transfer radical polymerization (Wang, U.S. Pat. No. 5,763, 548 (1998)).

Living/"living" polymerization processes have been successfully used to produce numerous specialty polymeric materials which have been found to be very useful in many applications. One example is the commercialization of styrenic thermoplastic elastomers such as styrene-b-butadiene-b-styrene triblock copolymers (SBS) by Shell chemicals and others. SBS is made by sequential anionic living polymerization of styrene and butadiene. However, except for living anionic polymerization of non-polar monomers such as styrene and dienes using alkyl lithium as an initiator, almost all of other living/"living" systems mentioned-above currently showed little promise for wide industrial commercialization, mainly due to high cost to industrially implement these processes. Thus, searching for practical living/"living" polymerization processes is a major challenge in the field of polymer chemistry and materials.

Alkyl halides have been used as initiator in several "living" polymerization systems. Sawamoto et al used a series of mixtures of alkyl halide and Lewis acid as initiating system in "living" cationic polymerization of vinyl ether, isobutylene, and styrene (Sawamoto, Trends Polym. Sci. 1, 111 (1993)). However, these cationic polymerizations required very restricted conditions such as moisture and impurities free reaction systems. Ganyor et al disclosed that combination of certain alkyl iodide with conventional radical initiator such as AIBN induced a "living" polymerization of styrene, methyl methacrylate, and methyl acrylate (Gaynor et al. Macromolecules 28, 8051 (1995)). The discovery of transition metal catalyzed atom transfer radical polymerization (ATRP) by Wang represents a very important step towards practical "living" polymerization (Wang, J. Am. Chem. Soc., 117, 5614 (1995)). Using alkyl halide as an initiator and transition metal species as a catalyst, ATRP not only works well with a very broad variety of important vinyl monomers but also provides much easier pathway towards a variety of polymers with various structure and architectures.

An initiating system comprising an alkyl halide and an onium salt has been also found to be effective in promoting "living" polymerization. Reetz (Reetz et al. Macromol. Rapid Commun. 17, 383 (1996)) disclosed that while neither diethyl or dimethyl iodomethylmalonate nor tetra-n-butylammonium iodide alone initiated the polymerization of methyl methacrylate (MMA), a "living" polymerization of MMA was achieved by using diethyl or dimethyl iodomethylmalonate/tetra-n-butylammonium iodide (1/1) as an initiating system in polar solvents. The controlled poly (methyl methacrylate) was obtained in the number-average molecular weight range of 2000 to 8000, with molecular weight distribution being fairly narrow (ratio of weight- to number-average molecular weights Mw/Mn 1.2–1.3). Although the underlying mechanism is still unclear, the onium salt used acts as a catalyst in this homogenous polymerization system. In comparison with other "living" systems, the alkyl iodide/ammonium salt combined catalyst system disclosed by Reetz represents a simpler and cleaner one towards "living" polymerization. Due to the instability of iodide containing organic compounds, however, such process may not be commercially feasible, and it has been found that more stable alkyl chlorides or bromides alone are not reactive enough to react with onium salt to generate initiating species in chain polymerization.

Phase-transfer catalysis, PTC, was first coined by Starks in 1971 (J. Am. Chem. Soc., 93, 195 (1971)). It has been widely and practically used in various preparative organic, organometallic and polymer chemistry. PTC is a technique for conducting reactions between two or more reagents in one or two or more phases, when reaction is inhibited because the reactants cannot easily come together and one reagent is not reactive enough towards another one. A "phase-transfer agent" is added to transfer one of the reagents to a location where it can conveniently and rapidly react with another reagent. Two types of phase transfer agents are found efficient: quaternary salts and certain chelating reagents such as crown ethers, cryptands, poly (ethylene glycol) and their derivatives.

Traditional fields of polymer chemistry like radical, anionic and condensation polymerizations, as well as chemical modification of polymers, have substantially benefited from the use of onium salts in phase transfer catalysis (Starks, Phase-Transfer Catalysis, ACS Symposium Series 326, 1987). Much work has been reported, e.g., on the use of onium salts in condensation polymerization for the synthesis of polyester, polysulfonates, polyphosphonates, polysulfones, polythioesters, polyamides, polycarbonate, etc (see: Percec, in Phase-Transfer, Chapter 9, Starks Ed., ACS Symposium Series, Vol. 326 (1987)). It was often noticed that, in the absence of such catalysts, only low molecular weight condensation polymer was produced even after long periods of time, whereas with the presence of the onium catalyst, high molecular weight of polymer was achieved after relatively short periods of time.

Phase transfer catalysis with onium salts has been also used in chain polymerization. Rasmussen and co-workers have disclosed that many free radical polymerizations of acrylic monomers can be conducted in two-phase systems using potassium persulfate and either crown ethers or quaternary ammonium salts as initiators (Rasmussen et al. in, Phase-Transfer Catalysis, ACS Symposium Series 326, Starks Ed., p 116, 1987). When transferred to the organic phase, persulfate performs far more efficiently as an initiator than conventional initiators such as azobisisobutyronitrile or benzoyl peroxide. Photopolymerization of methyl methacrylate with quaternized ammonium salt-potassium thiocyanate-$CCl_4$ was also reported (Shimada, S. Polym. J. 30, 152 (1998)). However, all disclosed polymerization processes using onium salts under phase transfer conditions were not living or "living". The monomer conversion to polymer was often very low; molecular weight can not be controlled; and molecular weight distribution is very broad (Mw/Mn often more than 2).

It is known that reaction between transition metal species of formula MY (where M represents a transition metal and Y represents one or more counter-anion or coordinative ligands) and an onium salt $W^+X'^-$ (where $W^+$ represents a cation with one or more proton than is required to make a neutral molecule and $X'^-$ represents a counter-anion) leads to a new onium salt complex $[MX'Y]^-W^+$ as illustrated as in Scheme 1:

Scheme 1

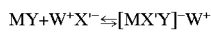

(see Loupy and Tchoubar, Salt Effects in Organic and Organometallic Chemistry, VCH Publishers, Inc., New York, 1992). The reactivity of an onium salt ($W^+X'^-$) in catalyzing organic reaction can be largely modified by reacting with a transition metal species (MY).

It would be desirable to provide a novel method for living polymerization of vinyl monomers which provides a high level of macromolecular control over the polymerization process and which leads to more uniform and more controllable polymeric products. It would be especially desirable to provide such a living polymerization process with existing facility, which relies on readily available starting materials and catalysts.

None of the prior art discloses a process for living or "living" polymerization of vinyl monomers catalyzed by an onium salt complex resulted from reaction between an onium salt and a transition metal species. Specially, none of the prior art discloses the use of organic halides as the initiator for living or "living" polymerization of monomers while using such a catalysis system.

SUMMARY OF THE INVENTION

In accordance with one embodiment of the invention, a process for polymerization of vinyl monomers is described comprising (a) forming an onium salt complex comprising a transition metal component by reacting an onium salt with a transition metal species, and (b) polymerizing vinyl monomers in the presence of the formed transition metal containing onium salt and an organic halide initiator compound.

In accordance with one particular embodiment of the present invention, a process for polymerization of vinyl monomers is disclosed comprising polymerizing vinyl monomers in the presence of (i) an organic halide compound and (ii) a onium salt complex of the formula $[MX'Y]^-W^+$ formed by reacting an onium salt of the formula $W^+X'^-$ with a transition metal species of the formula MY, where $W^+$ is a cationic onium ion group containing $N^+$, $P^+$, $S^+$, $As^+$, or $Sb^+$ element, $X'^-$ is a counter-anion, M is a transition metal atom with a formal charge of from 0–7, and Y is one or more counter-anion or coordinative ligand.

In accordance with an additional particular embodiment of the invention, a process for polymerization of vinyl monomers is described comprising combining vinyl monomers with (i) an organic halide initiator compound of the formula R—X, (ii) an onium salt of the formula $W^+X'^-$, and (iii) a transition metal species of the formula MY, where R represents an organic moiety, X represents a halogen atom, $W^+$ is a cationic onium ion group containing $N^+$, $P^+$, $S^+$, $As^+$, or $Sb^+$ element, $X'^-$ is a counter-anion, M is a transition metal atom with a formal charge of from 0–7, and Y is one or more counter-anion or coordinative ligand.

The present invention provides a novel method for living polymerization of vinyl monomers, which provides a high level of macromolecular control over polymerization process and which leads to more uniform and more controllable polymeric products. In accordance with preferred embodiments of the invention, the organic halide initiator comprises an organic chloride or bromide compound, as the onium salt complexes which comprise a transition metal provide catalystic effect required for use of such initiator compounds relative to organic iodide initiator compounds.

DETAILED DESCRIPTION OF THE INVENTION

In the context of the present invention, the term "living" refers to the ability to produce a product having one or more properties which are reasonably close to their predicted value. The polymerization is said to be "living" if the resulting number average molecular weight is close to the predicted molecular weight based on the ratio of the concentration of the consumed monomer to the one of the initiator; e.g., within an order of magnitude, preferably within a factor of five, more preferably within a factor of 3, and most preferably within a factor of two, and to produce a product having narrow molecular weight distribution as defined by the ratio of weight average molecular weight to number molecular weight (MWD); e.g., less than 10, preferably less than 2, more preferably less than 1.5, most preferably less than 1.2. Moreover, compared with conventional polymerization, the conversion of the monomer in "living" polymerization is higher, e.g., higher than 10%, preferably higher than 30%, more preferably higher than 50%, most preferably higher than 80%.

In the present invention, the added presence of a transition metal species which reacts with the onium salt to form a new onium salt complex facilitates polymerization of vinyl monomers in the presence of an organic halide initiating species. As an initiator organic halide compound, any organic halide, R—X, can be selected where R is any organic moiety and X is a halide atom. While the inventive polymerization process may be advantageously used with various organic halide initiating compounds which include organic iodides, it is particularly useful with organic bromide or chloride compounds which typically can not induce "living" polymerization as defined herein, or in many instances even polymerization, with simple onium salt polymerization catalysts which do not contain a transition metal species.

Examples of initiators include but are not limited to ethyl 2-bromoisobutyrate, diethyl 2-bromo-2-methylmalonate, 2-chloropropionitrile, 2-bromopropionitrile, 2-bromo-2-methylpropionic acid, 2-bromoisobutyrophone, 2-bromoisobutyryl bromide, 2-chloroisobutyryl chloride, α-bromo-α-methyl-γ-butyrolactone, p-toluenesulfonyl chloride and its substituted derivatives, 1,3-benzenedisulfonyl chloride, carbon tetrachloride, carbon tetrabromide, chlorine acetonitrile, tribromoethanol, tribromoacetyl chloride, trichloroacetyl chloride, tribromoacetyl bromide, chloroform, 1-phenyl ethylchloride, 1-phenyl ethylbromide, 2-halo-$C_{1-10}$-carboxylic acid (such as 2-chloropropionic acid, 2-bromoisobutyric acid), $C_{1-10}$-alkyl esters of 2-halo-$C_{1-10}$-carboxylic acid, compounds of the formula $C_6H_x(CH_2X)_y$ or $C_x[(CH_2)_n(CH_2X)]_y$' (where X is halogen, x+y= 6, x'+y'=4, n is 0–5, and y and y' are not less than 1), 4-vinyl benzene sulfonyl chloride, vinyl benzenechloride, 2-chloroisobutyrophenone, 2-bromoisobutyrophenone, iodoacetonitrile.

Various onium salt complexes can be used in the present invention, which can be selected from the group with the following formula:

[MX'Y]⁻W⁺ which results from reaction between an onium salt of the formula $W^+X'^-$ with a transition metal species of the formula MY, where $W^+$ is a cationic onium ion group containing $N^+$, $P^+$, $S^+$, $As^+$, or $Sb^+$ element, $X'^-$ is a counter-anion, M is a transition metal atom with a formal charge of from 0–7, and Y is one or more counter-anion or coordinative ligand.

Onium salt counter-anion $X'^-$ may be selected, e.g., from the group consisting of $Cl^-$, $Br^-$, $I^-$, $NO_3^-$, $NO_2^-$, $ClO_3^-$, $BrO_3^-$, $IO_3^-$, $ClO_4^-$, $MnO_4^-$, $ReO_4^-$, $IO_4^-$, $CrO_4^{-2}$, nolybdate, tungstate, vanadate, borate, $SO_4^{-2}$, $S^{-2}$, $S_2O_3^{-2}$, arsentite, arsenate, selenite, tellurite, $(CO_2^-)_2$, $CO_3^{-2}$, $F^-$, $CH_3CO_2^-$, $C_6H_5CO_2^-$, $SCN^-$, $MeSO_3^-$, $N_3^-$, $Br_3^-$, $OH^-$, $CN^-$, picrate, nitrate, acetate, sulfate. Any onium salts described in *Phase-Transfer Catalysis, Fundamentals, Applications, and Industrial Perspectives* (Starks, et al. Chapman & Hall, New York, 1994) with the formula $W^+X'^-$ (where $W^+$ and $X'^-$ are as defined above) can be used in the present invention, such as described above with respect to phase transfer agents. Preferred $W^+X'^-$ onium salts include but are not limited to: $Me_4N^+Br^-$, $Pr_4N^+Br^-$, $Bu_4N^+Br^-$, $Bu_4P^+Br^-$, $Bu_4N^+Cl^-$, $Bu_4N^+F^-$, $Bu_4N^+I^-$, $Bu_4P^+Cl^-$, $(C_8H_{17})_3NMe^+Cl^-$, $(C_8H_{17})_3PEt^+Br^-$, $C_6H_{13}NEt_3$, $^+Br^-$, $C_7H_{17}NEt_3$, $^+Br^-$, $C_{10}H_{20}NEt_3{}^+Br^-C_{16}H_{33}NEt_3{}^+Br^-$, $C_{16}H_{13}NEt_3{}^+Br^-$, $C_6H_5PEt_3{}^+Br^-$, $C_6H_5CH_2NEt_3{}^+Br^-$, $C_{16}H_{33}PMe_3{}^+Br^-$, $(C_6H_5)_4P^+Br^-$, $(C_6H_5)_4As^+Cl^-$, $(C_6H_5)_4As^+Br^-$, $(C_6H_5)_3PMe^+Br^-$, $(HOCH_2CH_2)_3NBu^+Br$, $Bu_4N^+OH^-$, $Bu_4N^+(ClCrO_3)^-$, $Bu_4N^+CN^-$, $Bu_4N^+BH_3CN^-$, $Bu_4N^+(H_2PO_4)^-$, $Bu_4N^+(H_2PO_2)^-$, $Bu_4N^+1/2(PtCl_6)^-$, $Bu_4N^+PF_6^-$, $Bu_4N^+HSO_4^-$, $Bu_4N^+[CH_3CH(OH)CO_2]^-$, $Bu_4N^+NO_3^-$, $Bu_4N^+IO_4^-$, $Bu_4N^+ReO_4^-$, $Bu_4N^+BF_4^-$, $Bu_4N^+[B(C_6H_5)_4]^-$, $Bu_4N^+[CF_3SO_3]^-$,

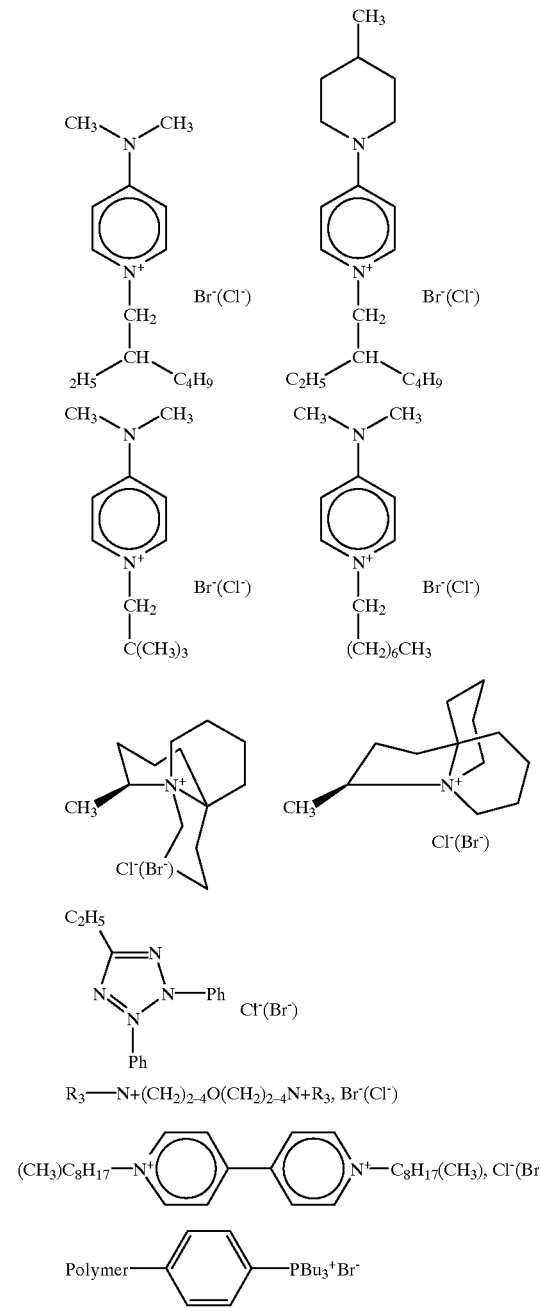

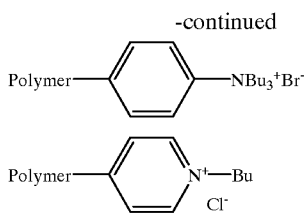

Any transition metal compound that is able to react with an onium salt $W^+X'^-$ to form a new onium salt complex as illustrated in Scheme 1 can be used in the present invention. The transition metal compound used can be selected from the group with the formula MY where M is a transition metal atom with a formal charge of from 0–7 which may be selected, e.g., from the group consisting of Ag, Au, Cu, Co, Cr, Fe, Hg, Ir, Mo, Nb, Ni, Os, Pd, Pt, Re, Rh, Ru, Tb, Ta, V, W, and Zn; and Y is one or more counter-anion or coordinative ligand. Counter-anions which may be used for Y may be selected, e.g., from those set forth for $X'^-$ above, and representative coordinative ligands may be, e.g., (CO), cyclopentadienyl, and cyclooctadiene.

In accordance with Scheme 1, the "ordinary" onium salt anion $X'$ enters the coordination sphere of the transition metal and consequently results in a completely new onium salt. This can occur in two ways depending on whether the metal compound is coordinatively unsaturated or saturated in the presence of the salt. When the metal complex has vacant coordination sites, the salt anion can simply add to the metal. If the initial compound is electrically neutral, addition of one or more anions transforms it into a negatively charged complex, usually referred to as an "ate complex". One example illustrating this effect is shown as follows.

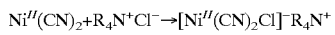

As for coordinatively saturated complexes, they can undergo two types of reaction in the presence of an onium salt. If the initial complex is uncharged, replacement of a two neutral ligand by an $X'^-$ anion gives, as in the previous case, an anion complex in which the metal's oxidation state remains unchanged (Forster, J. Am. Chem. Soc., 97, 951 (1975)), as for example:

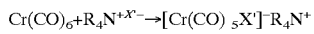

Alternatively, a new onium salt complex can also be obtained on treatment of a corresponding dimeric (or polymeric) metal species with a salt, as for example:

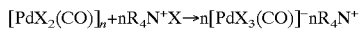

The onium salt complex formation reaction in Scheme 1 can be carried out before adding monomer and organic halide initiator or during the course of the polymerization. In the present invention, where an onium salt in the form of a quaternized monomer or monomers (e.g., 2-(dimethylamino)ethyl methacrylate, methyl chloride quaternized salt, and the like) is used, it may be unnecessary to add additional onium salt, and "living" polymerization of quaternized monomer can be considered as a monomer self-catalyzed polymerization. The formed onium salt complex can be used in a total amount of 0.01 to 100 moles, preferably 0.05 to 10 moles, more preferably 0.1 to 5 moles, and most preferably 0.2 to 2 moles per mole of the organic halide R—X initiator.

In the present invention, polymers with various specifically desired structures and architectures can be purposely produced. In terms of topology, such structures and architectures may include: linear, star, comb, hyperbranched, dendritic, cyclic, network, and the like. In terms of sequence/composition distribution such structures and architectures may include: homopolymer, random copolymer, block copolymer, graft copolymer, gradient copolymer, tapered copolymer, periodic copolymer, alternating copolymer, and the like.

In the present invention, any vinyl monomers can be polymerized and/or copolymerized in the presence of the above-mentioned initiating system. Examples of the monomers include but not limited to: carboxyl group-containing unsaturated monomers such as acrylic acid, methacrylic acid, crotonic acid, itaconic acid, maleic acid, fumaric acid, and the like (preferably methacrylic acid), $C_{2-8}$ hydroxyl alkyl esters of (meth)acrylic acid (preferably methacrylic acid) such as 2-hydroxylethyl (meth)acrylate, 2-hydroxylpropyl (meth)acrylate, 3-hydroxypropyl (meth)acrylate, hydroxybutyl (meth)acrylate and the like; monoesters between a polyether polyol (e.g., polyethylene glycol, polypropylene glycol or polybutylene glycol) and an unsaturated carboxylic acid (preferably methacrylic acid); monoethers between a polyether polyol (e.g., polyethylene glycol, polypropylene glycol or polybutylene glycol) and a hydroxyl group-containing unsaturated monomers (e.g., 2-hydroxyl methacrylate); adducts between an unsaturated carboxylic acid and a monoepoxy compound; adducts between glycidyl (meth)acrylates (preferably methacrylate) and a monobasic acid (e.g., acetic acid, propionic acid, p-t-butylbenzonic acid or a fatty acid); monoesters or diesters between an acid anhydride group-containing unsaturated compounds (e.g., maleic anhydride or iraconic anhydride) and a glycol (e.g. ethylene glycol, 1,6-hexaediol or neopentyl glycol); chlorine-, bromine-, fluorine-, and hydroxyl group containing monomers such as 3-chloro-2-hydroxylpropyl (meth)acrylate (preferably methacrylate) and the like; $C_{1-24}$ alkyl esters or cycloalkyl esters of (meth)acrylic acid (preferably methacrylic acid), such as methyl methacrylate, ethyl methacrylate, propyl methacrylate, isopropyl methacrylate, n-, sec-, or t-butyl methacrylate, hexyl methacrylate, 2-ethylhexyl methacrylate, octylmethacrylate, decyl methacrylate, lauryl methacrylate, stearyl methacrylate, cyclohexyl methacrylate and the like; $C_{2-18}$ alkoxyalkyl esters of (meth)acrylic acid (preferably methacrylic acid), such as methoxybutyl methacrylate, methoxyethyl methacrylate, ethoxyethyl methacrylate, ethoxybutyl methacrylate and the like; olefines or diene compounds such as ethylene, propylene, butylene, isobutene, isoprene, chloropropene, fluorine containing olefins, vinyl chloride, and the like; ring-containing unsaturated monomers such as styrene and o-,m-,p-substitution products thereof such as N,N-dimethylaminostyrene, aminostyrene, hydroxystyrene, t-butylstyrene, carboxystyrene and the like, a-methyl styrene, phenyl (meth)acrylates, nitro-containing alkyl (meth)acrylates such as N,N-dimethyl-aminoethyl methacrylate, N-t-butylaminoethyl methacrylate; 2-(dimethylamino)ethyl methacrylate, methyl chloride quaternized salt, and the like; polymerizable amides such as (meth)acrylamide, N-methyl(meth)acrylamide, 2-acryloamido-2-methyl-1-propanesulfonic acid, and the like; nitrogen-containing monomers such as 2-, 4-vinyl pyridines, 1-vinyl-2-pyrrolidone, (meth)acrylonitrile, and the like; glycidyl group-containing vinyl monomers such as glycidyl (meth)acrylates and the like, vinyl ethers, vinyl acetate. These monomers can be used singly or as admixture of two or more than two.

Vinyl terminated macromonomers, such as any of those which are defined in "Chemistry and Industry of Macromonomers" (Yamashita, Huthig & Wepf, New York 1993), can also be used in the present invention. The preferable macromonomers are those terminated with methacrylate groups. Examples of such macromonomers include, but are not limited to, poly(ethylene oxide)methacrylate, poly (styrene)methacrylate, poly(siloxane)methacrylate, poly ((meth)acrylic acid)methacrylate, and poly(alkyloxazoline) methacrylate.

The above monomer or monomers can be used in a total amount of general 3–20,000 moles, preferably 5–2,000 moles, more preferably 10–1,000 moles per mole of the initiator. The molecular weight distribution of resultant polymer (defined by the ratio of weight average molecular weight to number average molecular weight) in the present invention is generally from 1.01 to 30, mostly from 1.05 to 3.0, and more preferably less than 2.0.

Various organic or inorganic functional groups can be introduced to the ends of formed polymer or copolymer. By definition, a functional group is a moiety attached to a molecule that performs a function in terms of the reactivity and/or the physical properties of the molecule bearing it. Example of functional groups include but not limited to: halogens (e.g., Cl, Br, I), hydroxyl (—OH) groups such as —CH$_2$OH, —C(CH$_3$)$_2$OH, —CH(OH)CH$_3$, phenol and the like, thiol (—SH) groups, aldehyde (—CHO) and ketone (>C=O) groups, amine (—NH$_2$) groups, carboxylic acid and salt (—COOM) (M is H, alkali metal or ammonium), sulfonic acid and salt (—SO$_3$M) (M is H, alkali metal or ammonium), amide (—CONH$_2$), crown and kryptand, substituted amine (—NR$_2$) (R is H or C$_{1-18}$ alkyl), —C=CR', —CH=CHR' (R' is H or alkyl or aryl or alkaryl or aralkyl or combinations thereof), —COX (X is halogen), —CH$_2$N (SiR'$_3$)$_2$, —Si(OR')$_3$, —CN, —CH$_2$NHCHO, —B(OR)$_2$, —SO$_2$Cl, —N$_3$, —MgX. Functionalized polymer and copolymers including macromonomer prepared in accordance with the invention may be obtained by two ways: (a) one-pot synthesis using functional initiator; (b) transformation of living or preformed polymer to a desirable functional group by known organic reactions.

The inventive process can be conducted between –70° C. and 200° C., preferably between 0° C. and 170° C., more preferably between 20° C. and 150° C., most preferably between 40° C. and 130° C.

Various polymerization technologies can be used to make the polymer, which include but not limited to: bulk polymerization, solution polymerization, emulsion polymerization, suspension polymerization, dispersion polymerization, precipitation polymerization, template polymerization, micro-emulsion polymerization. Various solvents can be used in the polymerization. Examples of the solvents include but are not limited to: water, aliphatic solvent, aromatic solvent, hetero-atom containing solvent, supercritical solvent, and the like.

Depending the expected molecular weight and other factors, polymerization times may vary from 10 seconds to 100 hours, preferably from 1 minute to 48 hrs, more preferably from 10 minutes to 24 hrs, most preferably from 30 minutes to 18 hrs.

The final polymer can be used as it is or may be further purified, isolated, and stored. Purification and isolation may involve removing residual monomer, solvent, and catalyst. The purification and isolation process may vary. Examples of isolation of polymers include but are not limited to precipitation, extraction, filtration, and the like. Final polymer product can also be used without further isolation such as in the form of the latex or emulsion.

Polymers prepared with the inventive process may be useful in a wide variety of applications. The examples of these applications are but not limited to: adhesives, dispersants, surfactants, emulsifiers, elastomers, coating, painting, thermoplastic elastomers, diagnostic and supporters, engineering resins, ink components, lubricants, polymer blend components, paper additives, biomaterials, water treatment additives, cosmetics components, antistatic agents, food and beverage packaging materials, release compounding agents in pharmaceuticals applications.

EXAMPLE 1

The following agents were weighted into a three-neck round flask equipped with a condenser and magnetic stirring bar under ambient atmosphere: 27 grams of methyl methacrylate, 23 ml of toluene, 0.4 grams of ethyl 2-bromoisobutyrate (0.002 mol), 0.43 grams of FeBr$_2$ (0.002 mol), and 0.65 grams of nBu$_4$NBr (0.002 mol). After purging the solution with inert nitrogen gas for 15 minutes, the flask was covered and placed in a pre-heated oil bath at 80° C. The polymerization solution became homogeneuous in 30 minutes. At time intervals, an aliquot of polymer solution was picked out to determine the conversion by means of 1H NMR in CDCl3 and molecular weight/molecular weight distribution by size exclusive chromatography (SEC) using polystyrene as a calibration standard. Results are shown in Table 1.

TABLE 1

| Time (min) | Conversion, % | M$_{n, cal.}$[a] | M$_n$ (SEC) | Mw/Mn, (SEC) |
|---|---|---|---|---|
| 30 | 50 | 6750 | | |
| 180 | 85 | 11480 | | |
| 420 | 93 | 12560 | 13500 | 1.19 |

[a]Calculated molecular weight, M$_{n,cal}$ = (W$_{monomer}$)/[ethyl 2-bromoisobutyrate]$_o$ × conversion, where W$_{monomer}$ and [ethyl 2-bromoisobutyrate]$_o$ are initial weight of monomer and initial mole concentration of ethyl 2-bromoisobutyrate.

EXAMPLE 2

Comparative Example

The experiment was carried out under the same conditions as in Example 1 except without using ethyl 2-bromoisobutyrate. After 20 hrs, the monomer conversion is zero according to 1H NMR data.

EXAMPLE 3

Comparative Example

The experiment was carried out under the same conditions as in Example 1 except for without using FeBr$_2$. After 10 hrs, the monomer conversion is zero according to 1H NMR data.

EXAMPLE 4

Comparative Example

The experiment was carried out under the same conditions as in Example 1 except for without using nBu$_4$NBr. After 10 hrs, the monomer conversion is zero according to 1H NMR data.

EXAMPLE 5

The following agents were weighted into a three necks round flask equipped with a condenser and magnetic stirring bar under ambient atmosphere: 38 grams of methyl methacrylate, 40 ml of toluene, 0.41 grams of ethyl 2-bromoisobutyrate (0.0021 mol), 0.43 grams of $FeBr_2$ (0.002 mol), and 0.60 grams of $nBu_4PBr$ (0.0018 mol). After purging the solution with inert nitrogen gas for 30 minutes, the flask was covered and placed in a pre-heated oil bath at 80° C. The polymerization solution became homogeneous in 30 minutes. At time intervals, an aliquot of polymer solution was picked out to determine the conversion and molecular weight/molecular weight distribution. Results are shown in Table 2.

TABLE 2

| Time (min) | Conversion % | $M_{n, cal}$ | $M_{n, sec}$ | Mw/Mn, sec |
|---|---|---|---|---|
| 60 | 51 | 9230 | 12100 | 1.2 |
| 240 | 64 | 11600 | 13900 | 1.2 |
| 420 | 82 | 13200 | 15300 | 1.25 |

EXAMPLE 6

The following agents were weighted into a three necks round flask equipped with a condenser and magnetic stirring bar under ambient atmosphere: 50 grams of methyl methacrylate, 50 grams of p-xylene, 0.4 grams of carbon tetrachloride (0.003 mol), 0.5 grams of $FeBr_2$ (0.0023 mol), and 0.80 grams of $nBu_4NBr$ (0.0025 mol). After purging the solution with inert nitrogen gas for 30 minutes, the flask was covered and placed in a pre-heated oil bath at 100° C. The polymerization solution became homogeneuous in 30 minutes. After 6 hrs, the polymer was isolated by precipitating from methanol. Yield: 40%. The polymer was characterized by means of SEC with number average molecular weight (Mn) and molecular weight distribution Mw/Mn being 6210 and 1.17, respectively. The calculated Mn is 6670.

EXAMPLE 7

The following agents were weighted into a three necks round flask equipped with a condenser and magnetic stirring bar under ambient atmosphere: 10 grams of methyl methacrylate, 5 grams of phenyl ether, 0.154 grams of carbon tetrachloride (0.001 mol), 0.186 grams of ferrocene (0.001 mol), and 0.32 grams of $nBu_4NBr$ (0.001 mol). After purging the solution with inert nitrogen gas for 30 minutes, the flask was covered and placed in a pre-heated oil bath at 80° C. After 4 hrs, the polymerization was stopped by lowering down to room temperature. Polymer was then isolated by precipitating from methanol. Yield: 45%. The polymer was characterized by means of SEC with number average molecular weight (Mn) and molecular weight distribution Mw/Mn being 35,100 and 1.95, respectively. The calculated Mn is 4500.

EXAMPLE 8

The following agents were weighted into a three necks round flask equipped with a condenser and magnetic stirring bar under ambient atmosphere: 11 grams of methyl methacrylate, 11 grams of toluene, 0.2 grams of ethyl 2-bromoisobutyrate (0.001 mol), 0.22 grams of $FeBr_2$ (0.001 mol), and 0.44 grams of tetraphenyl arsonium chloride (0.001 mol). After purging the solution with inert nitrogen gas for 30 minutes, the flask was covered and placed in a pre-heated oil bath at 97° C. After 4 hrs, an aliquot of solution was picked out and dissolved in CDCl3 to determine the conversion. The conversion is 91%. Polymerization was terminated after 5 hrs with the conversion being 95%. Polymer was then isolated by precipitating from methanol. The polymer was characterized by means of SEC with number average molecular weight (Mn) and molecular weight distribution Mw/Mn being 64100 and 2.1, respectively.

EXAMPLE 9

The following agents were weighted into a three necks round flask equipped with a condenser and magnetic stirring bar under ambient atmosphere: 11 grams of methyl methacrylate, 11 grams of toluene, 0.2 grams of ethyl 2-bromoisobutyrate (0.001 mol), 0.22 grams of $Pd(OAc)_2$ (0.001 mol), and 0.34 grams of $nBu_4PBr$ (0.001 mol). After purging the solution with inert nitrogen gas for 30 minutes, the flask was covered and placed in a pre-heated oil bath at 80° C. At time intervals, an aliquot of polymer solution was picked out to determine the conversion and molecular weight/molecular weight distribution by size exclusive chromatography (SEC). Results are shown in Table 3.

TABLE 3

| Time (min) | Conversion % | $M_{n, cal}$ | $M_{n, sec}$ | Mw/Mn, sec |
|---|---|---|---|---|
| 455 | 35 | | | |
| 1595 | 76 | 8360 | 13500 | 1.07 |

EXAMPLE 10

The following agents were weighted into a three necks round flask equipped with a condenser and magnetic stirring bar under ambient atmosphere: 22 grams of methyl methacrylate, 22 grams of toluene, 0.4 grams of p-toluene sulfonyl chloride (0.0021 mol), 0.43 grams of $FeBr_2$ (0.002 mol), and 0.65 grams of $nBu_4NBr$ (0.002 mol). After purging the solution with inert nitrogen gas for 30 minutes, the flask was covered and placed in a pre-heated oil bath at 97° C. After 29hrs, the polymerization was stopped by lowering down to room temperature. An aliquot of solution was picked out and dissolved in CDCl3 to determine the conversion by means of 1H NMR. The conversion is 64%. Polymer was isolated by precipitating from methanol. The polymer was characterized by means of SEC with number average molecular weight (Mn) and molecular weight distribution Mw/Mn being 12000 and 1.10, respectively.

EXAMPLE 11

The following agents were weighted into a three necks round flask equipped with a condenser and magnetic stirring bar under ambient atmosphere: 9 grams of styrene, 22 grams of toluene, 0.2 grams of ethyl 2-bromoisobutyrate, 0.1 grams of $Pd(OAc)_2$, and 0.17 grams of nBu4PBr. After purging the solution with inert nitrogen gas for 30 minutes, the flask was covered and placed in a pre-heated oil bath at 100° C. An aliquot of solution was picked out and dissolved in CDCl3 to determine the conversion by means of 1H NMR and the molecular weight data were determined by means of SEC. Results are shown in Table 4.

TABLE 4

| Time (min) | Conversion % | $M_{n, cal}$ | $M_{n, sec}$ | Mw/Mn, sec |
|---|---|---|---|---|
| 5 | 41 | 3690 | 20900 | 2.35 |
| 22 | 73 | 6570 | 30400 | 3.72 |

EXAMPLE 12

Poly (methyl methacrylate) with end-functional carboxylic acid (PMMA-COOH) is synthesized as follows. The following agents were first weighted into a three necks round flask equipped with a condenser and magnetic stirring bar under ambient atmosphere: 10 grams of methyl methacrylate, 10 grams of toluene, 0.17 grams of 2-bromo-2-methyl propionic acid, and 0.17 grams of nBu$_4$PBr. After purging the solution with inert nitrogen gas for 30 minutes, 0.22 grams of FeBr$_2$ was added to the flask and the flask was covered and placed in a pre-heated oil bath at 80° C. After 8 hours 15 minutes, the polymerization was stopped with the conversion being 70% by means of 1H NMR. Polymer was recovered by precipitating from methanol and characterized by means of SEC with Mn and Mw/Mn being 9500 and 1.5, respectively.

EXAMPLE 13

Poly(methyl methacrylate) with end-functional hydroxyl group (PMMA-OH) is synthesized as follows. The experiment was carried out in the same condition as in example 12 except using 0.2 grams of tribromo ethanol instead of 0.17 grams of 2-bromo-2-methyl propionic acid. After 8 hours, the monomer conversion is 90%. Mn and Mw/Mn are 10500 and 1.1, respectively.

EXAMPLE 14

Synthesis of anionic poly (methacrylic acid). The following agents were first weighted into a three necks round flask equipped with a condenser and magnetic stirring bar under ambient atmosphere: 10 grams of methacrylic acid, 0.20 grams of ethyl 2-bromoisobutyrate, and 0.20 grams of nBu$_4$PBr. After purging the solution with inert nitrogen gas for 10 minutes, 0.20 grams of FeBr$_2$ was added to the flask and the flask was covered and placed in a pre-heated oil bath at 70° C. After 17 hours, the polymerization was stopped with the conversion being 40% by means of 1H NMR in D2O. Polymer was first neutralized with NaOH to pH 7 and recovered by precipitating from acetone. The polymer was finally characterized by means of SEC (poly(ethylene glycol) as calibration standard) with Mn and Mw/Mn being 2560 and 1.37, respectively. Theoretical molecular weight is 4000. Molecular weight calculated based on 1H NMR is 4950.

EXAMPLE 15

Synthesis of cationic poly(N-[3-(dimethylamino)propyl] methacrylamide, methyl chloride quaternary salt). The following agents were first weighted into a three necks round flask equipped with a condenser and magnetic stirring bar under ambient atmosphere: 10 grams of N-[3-(dimethylamino)propyl]methacrylamide, methyl chloride quaternary salt, 0.21 grams of ethyl 2-bromoisobutyrate, and 0.20 grams of FeBr$_2$, and 0.5 grams of deionized water. After purging the solution with inert nitrogen gas for 10 minutes, 0.20 grams of FeBr$_2$ was added to the flask and the flask was covered and placed in a pre-heated oil bath at 80° C. After 1.5 hours, the monomer conversion was about 23% by means of 1H NMR in D2O. Polymerization continued for another 16.5 hours and was stopped by lowering polymerization temperature to room temperature with the monomer conversion being 52%. The polymer was finally characterized by means of SEC (quaternized poly(2-viny pyridine) as calibration standard) with Mn and Mw/Mn being 538000 and 1.83, respectively.

EXAMPLE 16

The following agents were weighted into a three necks round flask equipped with a condenser and magnetic stirring bar under ambient atmosphere: 10 grams of methyl methacrylate, 10 grams of toluene, 0.21 grams of ethyl 2-bromoisobutyrate, 0.15 grams of CuBr, and 0.3 grams of Bu$_4$NNO$_3$. After purging the solution with inert nitrogen gas for 30 minutes, the flask was covered and placed in a pre-heated oil bath at 70° C. Polymerization was terminated after 23 hrs 15 minutes with the conversion being 50%. Polymer was then isolated by precipitating from methanol. The polymer was characterized by means of SEC with number average molecular weight (Mn) and molecular weight distribution Mw/Mn being 52200 and 1.4, respectively.

EXAMPLE 17

The following agents were weighted into a three necks round flask equipped with a condenser and magnetic stirring bar under ambient atmosphere: 5 grams of methyl methacrylate, 5 grams of toluene, 0.21 grams of ethyl 2-bromoisobutyrate, 0.22 grams of Zn(OAc), and 0.3 grams of Bu$_4$NNO$_3$. After purging the solution with inert nitrogen gas for 30 minutes, the flask was covered and placed in a pre-heated oil bath at 70° C. Polymerization was terminated after 17 hrs 15 minutes with the conversion being 14%. Polymer was then isolated by precipitating from methanol. The polymer was characterized by means of SEC with number average molecular weight (Mn) and molecular weight distribution Mw/Mn being 804000 and 1.88, respectively.

EXAMPLE 18

The experiment is similar to the one in example 17 except for using 0.15 grams of CuBr instead of 0.22 grams of Zn(OAc) and 0.3 grams of Bu$_4$N(OAc) instead of 0.3 grams of Bu$_4$NNO$_3$. After 17 hrs 15 minutes, the monomer conversion is 80%. The number average molecular weight (Mn) and molecular weight distribution Mw/Mn are 13500 and 1.7, respectively.

EXAMPLE 19

The following agents were first weighted into a three necks round flask equipped with a condenser and magnetic stirring bar under ambient atmosphere: 14.55 grams of vinylbenzyl chloride, 5 grams of anisol, 0.15 grams of CuBr. After purging the solution with inert nitrogen gas for 30 minutes, 0.3 grams of Bu$_4$NNO$_3$ was added to the flask and the flask was covered and placed in a preheated oil bath at 60° C. Polymerization was terminated after 73 hrs with monomer conversion being 25%. Polymer was then isolated by precipitating from methanol. The polymer was characterized by means of SEC with number average molecular weight (Mn) and molecular weight distribution Mw/Mn being 23600 and 2.98, respectively.

The invention has been described in detail with particular reference to preferred embodiments thereof, but it is to be understood that variations and modifications can be effected within the spirit and scope of the invention.

What is claimed is:

1. A process for polymerization of vinyl monomers, comprising (a) forming an onium salt complex comprising a transition metal by reacting an onium salt with a transition metal species, and (b) polymerizing vinyl monomers in the presence of the formed transition metal containing onium salt and an organic halide initiator compound.

2. The process of claim 1, wherein the initiator compound is of the formula R—X where R is an organic moiety and X is Cl or Br.

3. The process of claim 1, wherein the initiator compound comprises ethyl 2-bromoisobutyrate, diethyl 2-bromo-2-methylmalonate, 2-chloropropionitrile, 2-bromopropionitrile, 2-bromo-2-methylpropionic acid, 2-bromoisobutyrophone, 2-bromoisobutyryl bromide, 2-chloroisobutyryl chloride, α-bromo-α-methyl-γ-butyrolactone, p-toluenesulfonyl chloride and its substituted derivatives, 1,3-benzenedisulfonyl chloride, carbon tetrachloride, carbon tetrabromide, chlorine acetonitrile, tribromoethanol, tribromoacetyl chloride, trichloroacetyl chloride, tribromoacetyl bromide, chloroform, 1-phenyl ethylchloride, or 1-phenyl ethylbromide, 2-chloropropionic acid, 2-bromoisobutyric acid, 4-vinyl benzene sulfonyl chloride, vinyl benzenechloride, 2-chloroisobutyrophenone, 2-bromoisobutyrophenone, or iodoacetonitrile.

4. The process of claim 1, wherein the onium salt complex is of the formula $[MX'Y]^-W^+$ formed by reacting an onium salt of the formula $W^+X'^-$ with a transition metal species of the formula MY, where $W^+$ is a cationic onium ion group containing $N^+$, $P^+$, $S^+$, $As^+$, or $Sb^+$ element, $X'^-$ is a counter-anion, M is a transition metal atom with a formal charge of from 0–7, and Y is one or more counter-anion or coordinative ligand.

5. The process of claim 4, wherein the $X'^-$ counter-anion comprises $Cl^-$, $Br^-$, $I^-$, $NO_3^-$, $NO_2^-$, $ClO_3^-$, $BrO_3^-$, $IO_3^-$, $ClO_4^-$, $MnO_4^-$, $ReO_4^-$, $IO_4^-$, $CrO_4^{-2}$, nolybdate, tungstate, vanadate, borate, $SO_4^{-2}$, $S^{-2}$, $S_2O_3^{-2}$, arsentite, arsenate, selenite, tellurite, $(CO_2^-)_2$, $CO_3^{-2}$, $F^-$, $CH_3CO_2^-$, $C_6H_5CO_2^-$, $SCN^-$, $MeSO_3^-$, $N_3^-$, $Br_3^-$, $OH^-$, $CN^-$, picrate, nitrate, acetate, or sulfate.

6. The process of claim 4, wherein the $W^+X'^-$ onium salt comprises $Me_4N^+Br^-$, $Pr_4N^+Br^-$, $Bu_4N^+Br^-$, $Bu_4P^+Br^-$, $Bu_4N^+Cl^-$, $Bu_4N^+F^-$, $Bu_4N^+I^-$, $Bu_4P^+Cl^-$, $(C_8H_{17})_3NMe^+Cl^-$, $(C_8H_{17})_3PEt^+Br^-$, $C_6H_{13}NEt_3^+Br^-$, $C_7H_{17}NEt_3^+Br^-$, $C_{10}H_{20}NEt_3^+Br^-$, $C_{12}H_{25}NEt_3^+Br^-$, $C_{16}H_{33}NEt_3^+Br^-$, $C_6H_{13}PEt_3^+Br^-$, $C_6H_5CH_2NEt_3^+Br^-$, $C_{16}H_{33}PMe_3^+Br^-$, $(C_6H_5)_4P^+Br^-$, $(C_6H_5)_4As^+Cl^-$, $(C_6H_5)_4As^+Br^-$, $(C_6H_5)_3PMe^+Br^-$, $(HOCH_2CH_2)_3NBu^+Br$, $Bu_4N^+OH^-$, $Bu_4N^+(ClCrO_3)^-$, $Bu_4N^+CN^-$, $Bu_4N^+BH_3CN^-$, $Bu_4N^+(H_2PO_4)^-$, $Bu_4N^+(H_2PO_2)^-$, $Bu_4N^+\frac{1}{2}(PtCl_6)^-$, $Bu_4N^+PF_6^-$, $Bu_4N^+HSO_4^-$, $Bu_4N^+[CH_3CH(OH)CO_2]^-$, $Bu_4N^+NO_3^-$, $Bu_4N^+IO_4^-$, $Bu_4N^+ReO_4^-$, $Bu_4N^+BF_4^-$, $Bu_4N^+[B(C_6H_5)_4]^-$, $Bu_4N^+[CF_3SO_3]^-$,

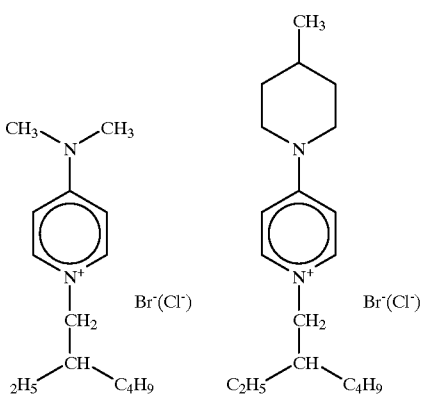

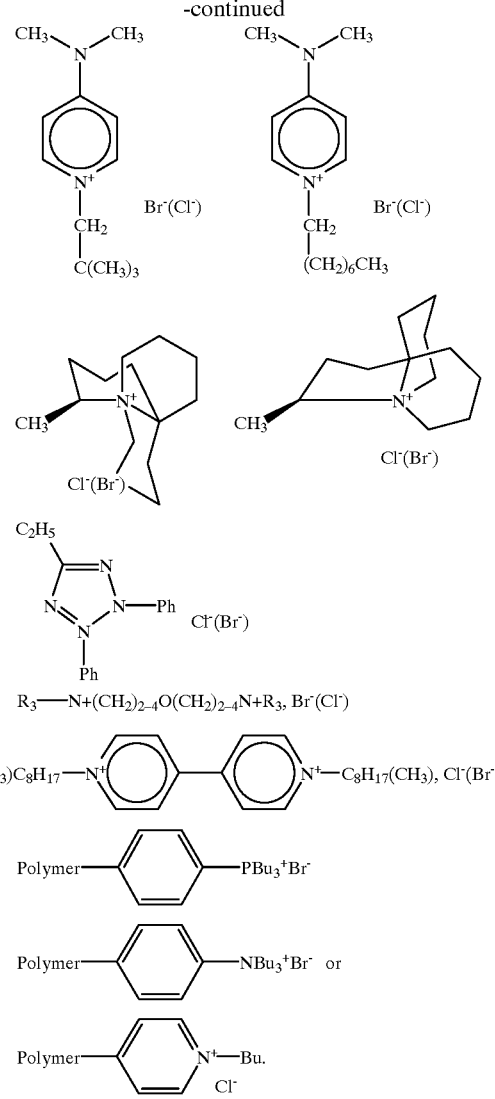

7. The process of claim 4, wherein M comprises Ag, Au, Cu, Co, Cr, Fe, Hg, Ir, Mo, Nb, Ni, Os, Pd, Pt, Re, Rh, Ru, Tb, Ta, V, W, or Zn; and Y comprises $Cl^-$, $Br^-$, $I^-$, $NO_3^-$, $NO_2^-$, $ClO_3^-$, $BrO_3^-$, $IO_3^-$, $ClO_4^-$, $MnO_4^-$, $ReO_4^-$, $IO_4^-$, $CrO_4^{-2}$, nolybdate, tungstate, vanadate, borate, $SO_4^{-2}$, $S^{-2}$, $S_2O_3^{-2}$, arsentite, arsenate, selenite, tellurite, $(CO_2^-)_2$, $CO_3^-$2, $F^-$, $CH_3CO_2^-$, $C_6H_5CO_2^-$, $SCN^-$, $MeSO_3^-$, $N_3^-$, $Br_3^-$, $OH^-$, $CN^-$, picrate, nitrate, acetate, sulfate, (CO), cyclopentadienyl, or cyclooctadiene.

8. The process of claim 1, wherein step (a) is performed prior to addition of monomers and polymerization step (b).

9. The process of claim 1, wherein step (a) is performed in situ after addition of monomers and concurrent with polymerization step (b).

10. The process of claim 1, wherein the formed onium salt complex is used in a total amount of 0.05 to 10 moles per mole of the organic halide initiator.

11. The process of claim 1, wherein the monomers are used in a total amount of from 3–20,000 moles per mole of the organic halide initiator.

12. A process for polymerization of vinyl monomers comprising combining vinyl monomers with (i) an organic halide initiator compound of the formula R—X where R represents an organic moiety and X represents a halogen atom, (ii) an onium salt of the formula $W^+X'^-$ where $W^+$ is a cationic onium ion group containing $N^+$, $P^+$, $S^+$, $As^+$, or $Sb^+$ element and $X'^-$ is a counter-anion, and (iii) a transition metal species of the formula MY, where M is a transition metal atom with a formal charge of from 0–7, and Y is one or more counter-anion or coordinative ligand.

13. The process of claim 12, wherein X is Cl or Br.

14. The process of claim 12, wherein the initiator compound comprises ethyl 2-bromoisobutyrate, diethyl 2-bromo-2-methylmalonate, 2-chloropropionitrile, 2-bromopropionitrile, 2-bromo-2-methylpropionic acid, 2-bromoisobutyrophone, 2-bromoisobutyryl bromide, 2-chloroisobutyryl chloride, α-bromo-α-methyl-γ-butyrolactone, p-toluenesulfonyl chloride and its substituted derivatives, 1,3-benzenedisulfonyl chloride, carbon tetrachloride, carbon tetrabromide, chlorine acetonitrile, tribromoethanol, tribromoacetyl chloride, trichloroacetyl chloride, tribromoacetyl bromide, chloroform, 1-phenyl ethylchloride, or 1-phenyl ethylbromide, 2-chloropropionic acid, 2-bromoisobutyric acid, 4-vinyl benzene sulfonyl chloride, vinyl benzenechloride, 2-chloroisobutyrophenone, 2-bromoisobutyrophenone, or iodoacetonitrile.

15. The process of claim 12, wherein the $X'^-$ counter-anion comprises $Cl^-$, $Br^-$, $I^-$, $NO_3^-$, $NO_2^-$, $ClO_3^-$, $BrO_3^-$, $IO_3^-$, $ClO_4^-$, $MnO_4^-$, $ReO_4^-$, $IO_4^-$, $CrO_4^{-2}$, nolybdate, tungstate, vanadate, borate, $SO_4^{-2}$, $S^{-2}$, $S_2O_3^{-2}$, arsentite, arsenate, selenite, tellurite, $(CO_2^-)_2$, $CO_3^{-2}$, $F^-$, $CH_3CO_2^-$, $C_6H_5CO_2^-$, $SCN^-$, $MeSO_3^-$, $N_3^-$, $Br_3^-$, $OH^-$, $CN^-$, picrate, nitrate, acetate, or sulfate.

16. The process of claim 12, wherein the $W^+X'^-$ onium salt comprises $Me_4N^+Br^-$, $Pr_4N^+Br^-$, $Bu_4N^+Br^-$, $Bu_4P^+Br^-$, $Bu_4N^+Cl^-$, $Bu_4N^+F^-$, $Bu_4N^+I^-$, $Bu_4P^+Cl^-$, $(C_8H_{17})_3NMe^+Cl^-$, $(C_8H_{17})_3PEt^{+Br-}$, $C_6H_{13}NEt_3^+Br^-$, $C_7H_{17}NEt_3^+Br$, $C_{10}H_{20}NEt_3^+Br^-$, $C_{12}H_{25}NEt_3^+Br^{31}$, $C_{16}H_{33}NEt_3^+Br^-$, $C_6H_{13}PEt_3^+Br^-$, $C_6H_5CH_2NEt_3^+Br^-$, $C_{16}H_{33}PMe_3^+Br^-$, $(C_6H_5)_4P^+Br^-$, $(C_6H_5)_4As^{+-}$, $(C_6H_5)_4As^+Br^-$, $(C_6H_5)_3PMe^+Br^-$, $(HOCH_2CH_2)_3NBu^+Br$, $Bu_4N^+OH^-$, $Bu_4N^+(ClCrO_3)^-$, $Bu_4N^+CN^-$, $Bu_4N^+BH_3CN^-$, $Bu_4N^+(H_2PO_4)^-$, $Bu_4N^+(H_2PO_2)^-$, $Bu_4N^{+½}(PtCl_6)^-$, $Bu_4N^+PF_6^-$, $Bu_4N^+HSO_4^-$, $Bu_4N^+[CH_3CH(OH)CO_2]^-$, $Bu_4N^+NO_3^-$, $Bu_4N^+IO_4^-$, $Bu_4N^+ReO_4^-$, $Bu_4N^+BF_4^-$, $Bu_4N^{+[B(C_6H_5)_4]^-}$, $Bu_4N^+[CF_3SO_3]^-$,

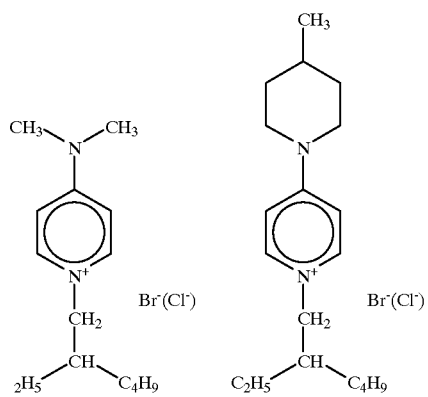

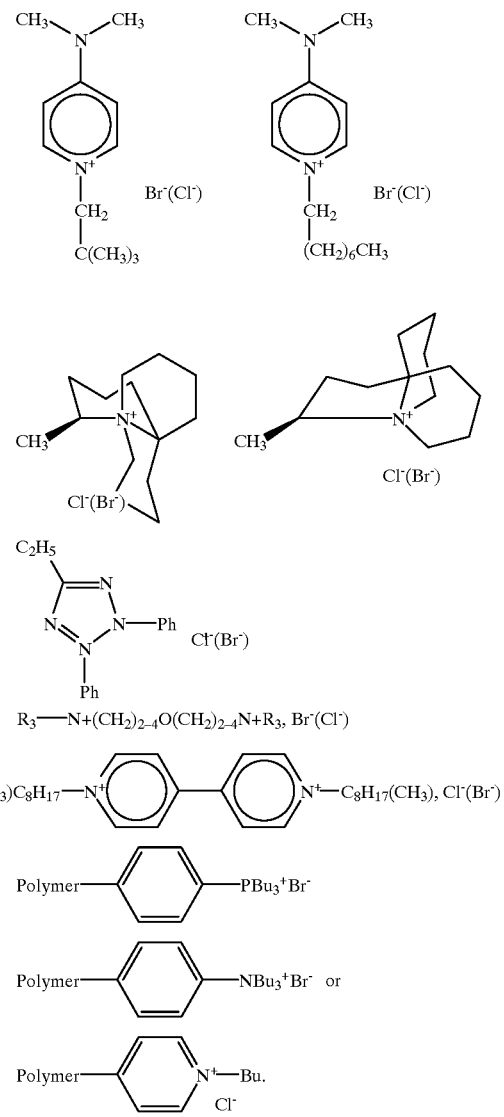

17. The process of claim 12, wherein M comprises Ag, Au, Cu, Co, Cr, Fe, Hg, Ir, Mo, Nb, Ni, Os, Pd, Pt, Re, Rh, Ru, Tb, Ta, V, W, or Zn; and Y comprises $Cl^-$, $Br^-$, $I^-$, $NO_3^-$, $NO_2^-$, $ClO_3^-$, $BrO_3^-$, $IO_3^-$, $ClO_4^-$, $MnO_4^-$, $ReO_4^-$, $IO_4^-$, $CrO_4^{-2}$, nolybdate, tungstate, vanadate, borate, $SO_4^{-2}$, $S^{-2}$, $S_2O_3^{-2}$, arsentite, arsenate, selenite, tellurite, $(CO_2^-)_2$, $CO_3^-2$, $F^-$, $CH_3CO_2^-$, $C_6H_5CO_2^-$, $SCN^-$, $MeSO_3^-$, $N_3^-$, $Br_3^-$, $OH^-$, $CN^-$, picrate, nitrate, acetate, sulfate, (CO), cyclopentadienyl, or cyclooctadiene.

18. The process of claim 12, wherein the onium salt is used in a total amount of 0.05 to 10 moles per mole of the organic halide initiator.

19. The process of claim 12, wherein the monomers are used in a total amount of from 3–20,000 moles per mole of the organic halide initiator.

20. The process of claim 1, wherein the vinyl monomers comprise methacrylic acid; $C_{2-8}$ hydroxyl alkyl esters of methacrylic acid; monoesters between a polyether polyol and methacrylic acid; monoethers between a polyether polyol and 2-hydroxyl methacrylate; adducts between glycidyl methacrylate and a monobasic acid; chlorine-, bromine-, fluorine-, or hydroxyl group containing methacrylate monomers; $C_{1-24}$ alkyl esters or cycloalkyl esters of methacrylic acid; $C_{2-8}$ alkoxyalkyl esters of methacrylic acid; phenyl methacrylates, nitro-containing alkyl methacrylates; methacrylamides; methacrylonitrile; glycidyl methacrylates; or a methacrylate group terminated macromonomer.

21. The process of claim 1, wherein the vinyl monomers comprise methyl methacrylate.

22. The process of claim 1, wherein the vinyl monomers comprise methacrylate or styrene monomers.

23. The process of claim 12, wherein the vinyl monomers comprise methacrylic acid; $C_{2-8}$ hydroxyl alkyl esters of methacrylic acid; monoesters between a polyether polyol and methacrylic acid; monoethers between a polyether polyol and 2-hydroxyl methacrylate; adducts between glycidyl methacrylate and a monobasic acid; chlorine-, bromine-, fluorine-, or hydroxyl group containing methacrylate monomers; $C_{1-24}$ alkyl esters or cycloalkyl esters of methacrylic acid; $C_{2-18}$ alkoxyalkyl esters of methacrylic acid; phenyl methacrylates, nitro-containing alkyl methacrylates; methacrylamides; methacrylonitrile; glycidyl methacrylates; or a methacrylate group terminated macromonomer.

24. The process of claim 12, wherein the vinyl monomers comprise methyl methacrylate.

25. The process of claim 12, wherein the vinyl monomers comprise methacrylate or styrene monomers.

* * * * *